United States Patent [19]
Berends

[11] 3,718,168
[45] Feb. 27, 1973

[54] PLANER

[75] Inventor: Emerson R. Berends, Tupelo, Miss.

[73] Assignee: Rockwell Manufacturing Company, Pittsburgh, Pa.

[22] Filed: Jan. 22, 1970

[21] Appl. No.: 4,815

[52] U.S. Cl. ............................. 144/117 R, 144/129
[51] Int. Cl. ................................................. B27c 1/02
[58] Field of Search ........ 144/114, 117, 243, 244, 129

[56] References Cited

UNITED STATES PATENTS

| | | | |
|---|---|---|---|
| 2,873,776 | 2/1959 | Buttke | 144/114 X |
| 2,913,060 | 11/1959 | Owen et al. | 172/747 |
| 2,780,251 | 2/1957 | Williams | 144/117 X |
| 3,067,788 | 12/1962 | Eschenberg | 144/117 |
| 2,669,265 | 2/1954 | Edgemond | 144/129 |
| 2,687,153 | 8/1954 | Moore | 144/117 |

*Primary Examiner*—Donald R. Schran
*Attorney*—Strauch, Nolan, Neale, Nies & Kurz

[57] ABSTRACT

A planing machine in which the workpiece supporting table is provided with an uninterrupted low friction, abrasion resistant surface over which a workpiece is smoothly advanced through the region of the cutters. The drive system for the machine includes a single motor from which the cutter head is directly driven and the infeed and outfeed rollers are driven through an intermediate variable speed drive assembly enabling an operator to vary the speed at which a workpiece is fed through the cutting regions. The motor and drive components are housed within closure panels which are retained on the machine frame by fastener assemblies that permit the panels to be quickly and easily removed from the frame. A cutter guard and chip breaker assembly is pivotally supported at the outfeed end of the machine to enable an operator to gain ready access to the cutter head and feed rollers if necessary. An eccentrically mounted limit bar at the infeed end of the machine provides an adjustable maximum depth of cut limiting means for conditioning the planer to operate within the power limitations of the selected motor by properly adjusting the setting of the limit bar.

25 Claims, 9 Drawing Figures

INVENTOR
EMERSON R. BERENDS

BY Strauch Nolan Neale Nies + Kurz
ATTORNEYS

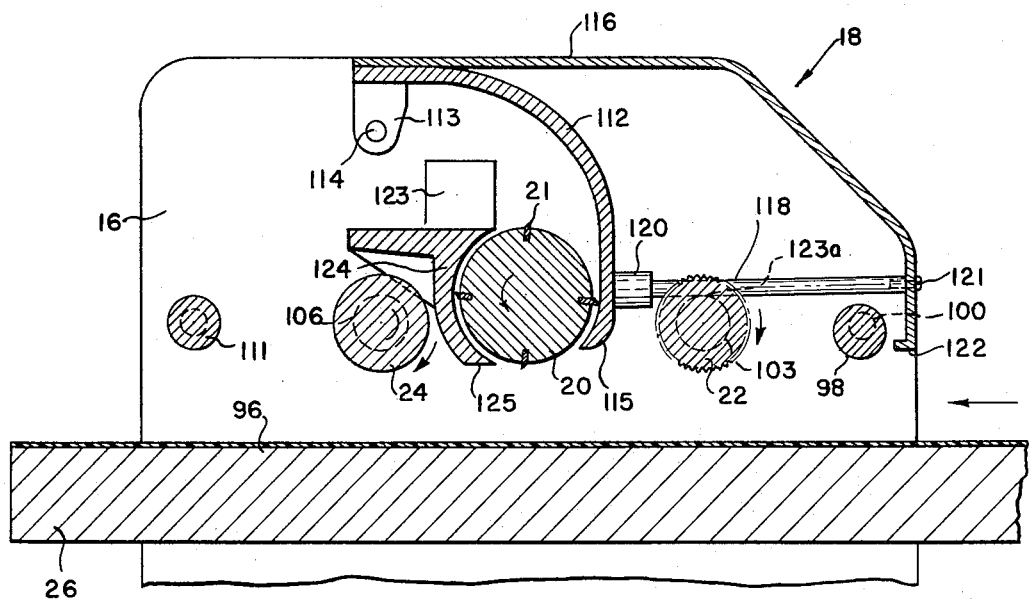
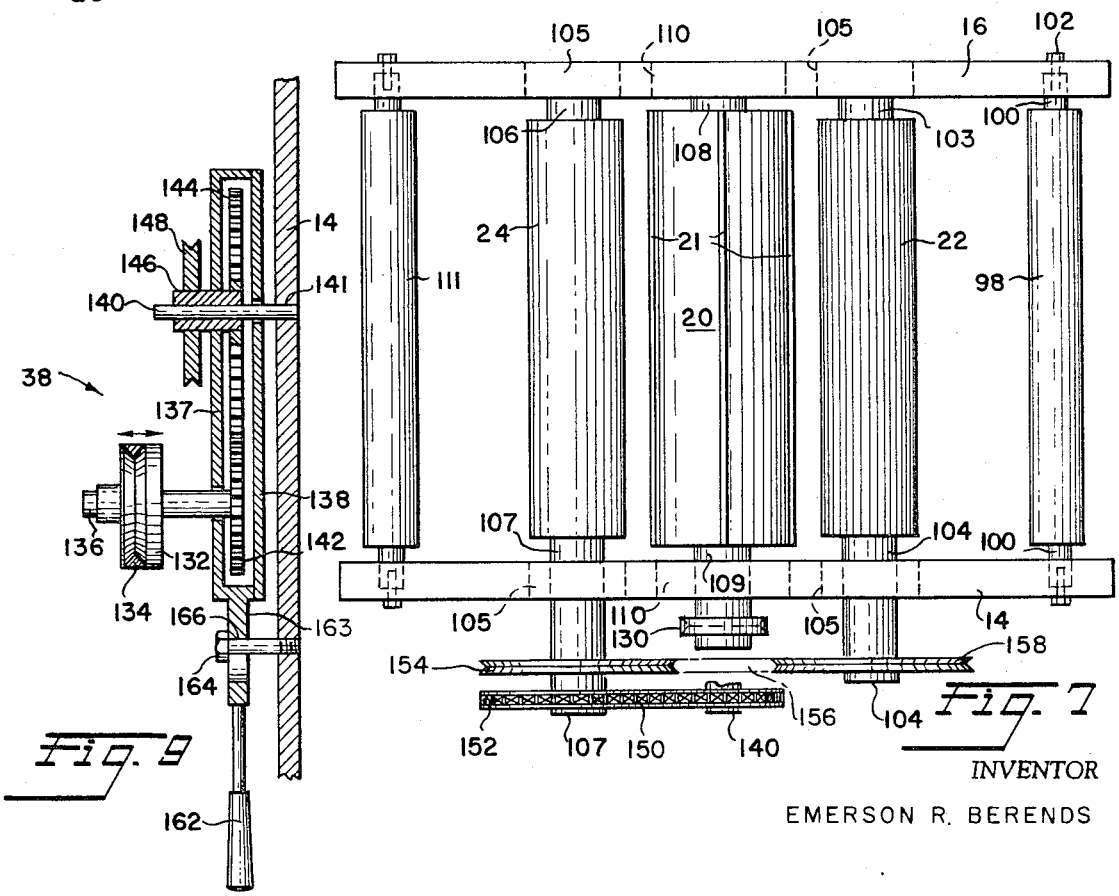

PLANER

BACKGROUND OF THE INVENTION

This invention relates generally to woodworking apparatus and more particularly to an improved wood planing machine which provides a ripple free, planar planed surface, reduces manufacturing costs, eliminates heretofore required critical set-up adjustments and is more versatile in operation than prior conventional machines and due to its adjustable depth of cut limit bar is able to accommodate motors of varying power capabilities without a change of limit bars.

Known wood planing machines generally include a cutter and power driven infeed and outfeed rollers mounted above a work supporting table fitted with idling support rollers to permit powered advancement of the workpiece across the table through the region of the cutter. These idling bed rollers have been a source of problems since they must be accurately set within extremely close tolerances, for example a few thousandths of an inch, to extend above the surface of the table and even when accurately set, the workpiece undulates in its feed movement causing the cutter to remove more or less stock at its opposite ends as the workpiece in its feed movement engages only the infeed table idler roller in approaching the cutter and the outfeed table idler roller as it leaves the cutter.

Conventional planers also lack versatility and adaptability for usage with different types of lumber from which various depths of cut may be taken due to their employment of separate motors for driving the cutters and the feed roller.

The speed of operation at which the infeed and outfeed rollers may be driven is normally limited and the construction of the prior machines generally imposes limitations on the size of the drive motor which may be used and the depth of cut which may be taken.

Another continuing problem with existing planing machines has been their inability to remove chips from the cutting region and discharge them away from the operator who is normally stationed at the infeed end of the machine. Chip breakers in existing commercial planing machines generally are rigidly fastened to the frame of the machine in enclosing relation to the cutter head and feed rollers, and have to be completely physically removed from the frame in order to gain access to the cutters and the feed rollers for purposes of adjustment, sharpening, cleaning, etc.

Similarly, the drive motors and gear assemblies for the feed rollers and cutter head ordinarily have been housed within cover panels which are screw fastened to the machine frame, and thus, do not provide ready and easy access to the components when necessary. Consequently, inspection and/or repair of machine components has ordinarily been a time consuming and costly operation.

SUMMARY OF THE INVENTION

Accordingly, a primary object of this invention resides in the provision of a novel improved wood planing machine which overcomes the above-identified problems associated with conventional machines while producing a smooth, ripple free and planar planed surface on a finished workpiece.

Another object of the invention resides in the provision of a novel wood planing machine which reduces manufacturing and repair costs and eliminates critical set-up adjustments normally associated with the idling table rollers in prior known machines.

Another object resides in the provision of a novel wood planing machine in which the table is provided with a tough, high slip, workpiece support surface having a low coefficient of friction enabling the wood workpiece to advance levelly thereover, thereby eliminating the need for the table rollers normally provided in conventional planing machines. Consequently, the problems associated with the critical adjustment of the table rollers and the snipe normally formed on the planed wood surface are eliminated to provide a smoother, more uniform finished workpiece.

Still another object resides in the provision of a novel wood planing machine including a variable speed drive mechanism for driving the feed rollers and thereby adjusting the rate at which a workpiece is fed through the cutter region to an optimum value depending upon the type of wood being worked on and the depth of cut to be taken from the workpiece.

A further object resides in the provision of a novel wood planing machine which includes a novel flip-over chip breaker and cutter guard assembly pivoted at the outfeed end of the machine, the chip breaker in a normal operating position effectively deflecting the chips from the cutting region to the rear of the machine and in a raised inoperative position providing ready access to the cutters and infeed and outfeed rollers for any necessary adjustment, cleaning and/or replacement of such.

Another object resides in the provision of a novel wood planing machine including a variable speed drive system for the feed rollers and a rotatable eccentrically mounted depth of cut limit bar at the infeed end of the machine, the variable speed drive system providing an optimum feed speed for a particular type of lumber being cut and the desired depth of cut, and the limit bar acting as a gauge to restrict the maximum depth of cut which may be taken. The variable speed drive may include a motor of a selected size and the eccentric limit bar may be adjusted to provide a maximum depth of cut corresponding to the size of the motor being employed.

Still another object resides in the provision of a novel wood planing machine in which the cover panels housing the various drive components are readily removable for quick and easy access to the drive components, thus reducing the amount of downtime required to service and/or change over the machine.

These and other objects of the invention will become more fully apparent by reference to the appended claims and the following detailed description when read in conjunction with the accompanying drawings, in which like numerals designate like parts.

BRIEF DESCRIPTION OF THE DRAWINGS

FIG. 6 is a fragmentary elevation section view illustrating the upper portion of the machine, and particularly the pivoted cutter guard and chip breaker assembly in its lowered operative position;

FIG. 7 is a fragmented plan view of the upper portion of the planing machine with the cutter guard and chip breaker assembly and pressure foot removed to expose the cutter head, feed rollers, depth of cut limit bar, and rear tie bar;

FIG. 9 is a fragmentary plan view taken generally along line 9—9 of FIG. 8 and illustrating the variable speed feed drive mechanism with the reduction gear housing broken away to expose the respective drive components and the manner in which they are mounted on the upstanding side column of the machine.

DETAILED DESCRIPTION OF A PREFERRED EMBODIMENT

Figure 1:
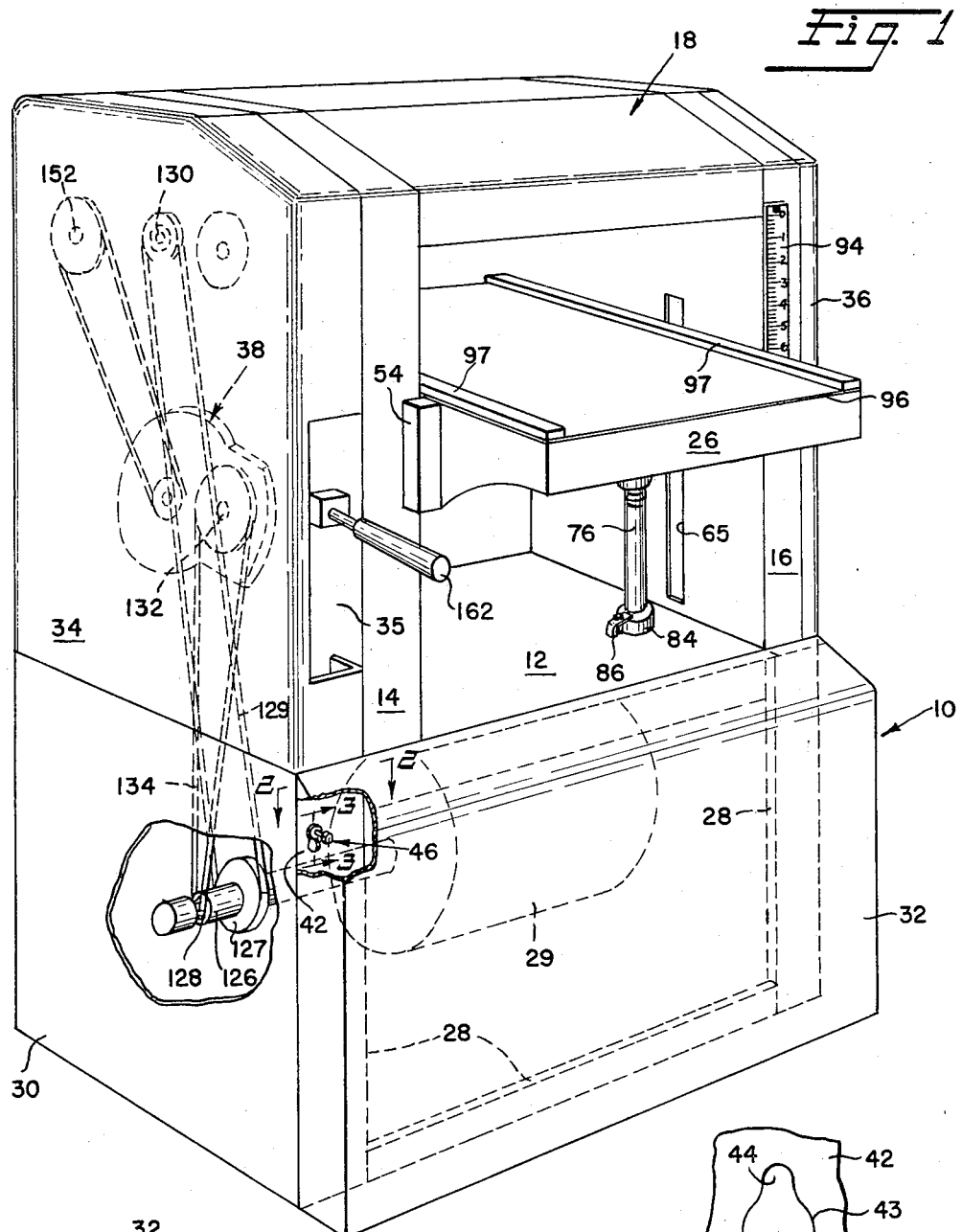
FIG. 1 is a fragmentary, generally perspective view of the improved wood planing machine embodying the principles of the invention.

Referring now to FIG. 1, the planer includes a base cabinet 10 having an upper horizontal base plate 12 on which a pair of upstanding side columns 14 and 16 is mounted. A cutter guard and chip breaker assembly 18 is pivotally connected to the upper rear end of columns 14 and 16, and, when in its lowered operative position of FIG. 1, serves also to house a power driven cutter head 20 and power driven parallel infeed and outfeed rollers 22 and 24, (see FIG. 6), the cutter head and feed rollers extending between and being mounted for rotation in columns 14 and 16. A work support table 26 is mounted between columns 14 and 16 below the cutter head and feed rollers for vertical up and down movement, thereby enabling the machine to accomodate pieces of lumber of various thicknesses.

The enclosed base cabinet 10 includes a plurality of weldedly connected frame members 28 on which base plate 12 is supported and a pair of side panels 30, a rear panel (not shown) and front panel 32 which is readily removable from frame members 28 to provide quick access to the drive motor 29 fixedly supported within cabinet housing 10.

A pair of enclosing side panels 34 and 36 are also mounted on base plate 12 and removably connected to the side columns 14 and 16 to permit quick access to the bearing support structure for the cutter head and feed rollers and also the variable speed feed drive mechanism 38 pivotally mounted on side column 14 and described in detail below. Panel 34 has a slot 35 through which a manual adjusting handle 162 of drive assembly 38 extends.

Figure 2:
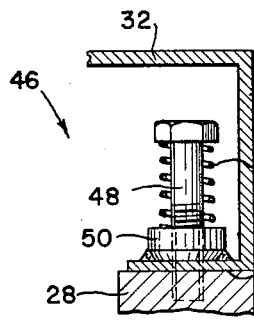
FIG. 2 is a fragmentary section plan view taken generally along line 2—2 of FIG. 1 and illustrating a keyhole and fastener bolt assembly by which the cover panels of the motor housing and gear housing are readily removably mounted on the planing machine frame.
Figure 3:
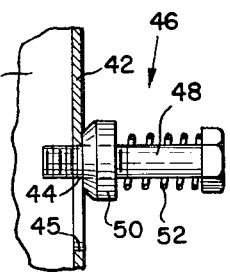
FIG. 3 is a fragmentary side elevation view of the keyhole and fastener bolt assembly taken generally along line 3—3 of FIG. 1.
Figure 4:
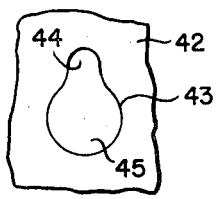
FIG. 4 is a fragmentary view of the keyhole slot in the end flange of the housing panels, the slot forming part of the assembly illustrated in FIGS. 2 and 3.

Referring now to FIGS. 2 - 4, the front panel 32 is a sheet metal stamping having U-shaped ends 40 providing an inner vertically extending flange 42 at each end, with a pair of vertically spaced keyhole slots 43 provided in each flange. Each slot has a small upper portion 44 and enlarged lower portion 45. Two vertically spaced spring biased bolt assemblies 46 are mounted on each of the of the vertical side frame members 28 to cooperate with the panel slots 43 in retaining panel member 32 in place. Each bolt assembly 46 includes a bolt 48 whose shank threads into blind bore in frame member 28, a forwardly tapered retainer nut element 50 slidably mounted on the shank of bolt 48 and a spring 52 positioned between the bolt head and the retainer 50 and biasing the retainer toward frame member 28. The lower enlarged portion 45 of panel slot 43 is large enough to pass over the bolt head and retainer 50 and the upper reduced portion 43 of the slot is somewhat larger than the diameter of the shank of bolt 48 but smaller in size than retainer 50. When panel 32 is mounted in place, the bolt shank will be received within slot portion 43 and retainer 50 will engage flange 42 and thus retain the panel against frame member 28 as shown in FIG. 3. When it is desired to remove the panel to expose motor 29 housed therein, it is necessary only to initially vertically lift panel 32, sliding flanges 42 upwardly along frame members 28 so that slot portion 45 aligns with retainer 50, and then simply move the panel outwardly over retainer 50 and the head of bolt 48 of each assembly 46. It is to be understood of course that any number of bolt assemblies may be used to retain panel 32 in place.

Side panels 34 and 36 are sheet metal stampings formed similarly to cover panel 32 to have U-shaped end flanges 42 by which the panels are retained respectively on posts 14 and 16 by similar bolt assemblies 46. Hence, it is readily apparent that an operator may quickly and easily remove panels 32, 34 and 36 to provide ready access to the machine components normally housed therein.

Figure 5:
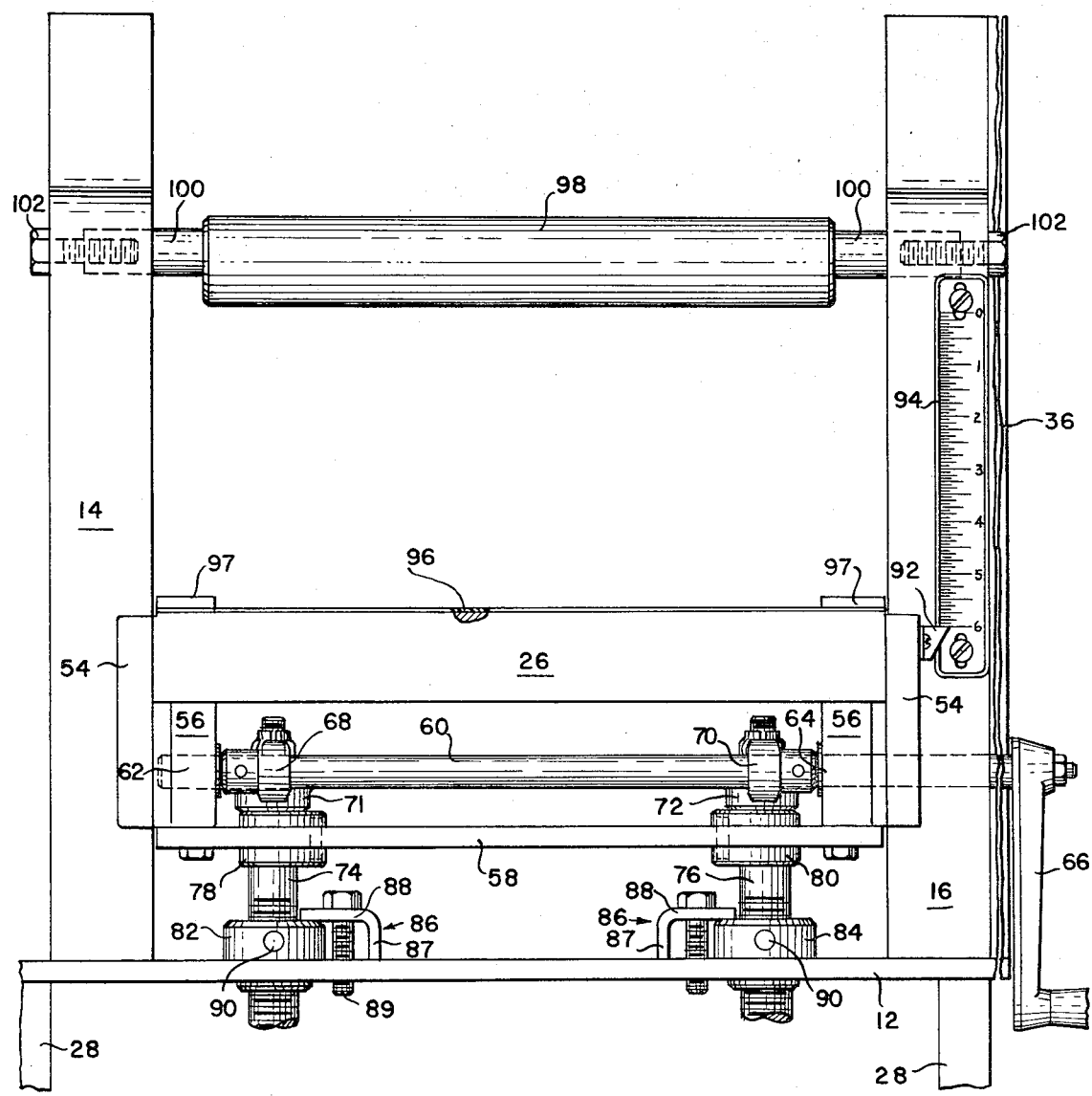
FIG. 5 is a fragmentary front elevation view illustrating the table weight adjustment mechanism and the depth of cut limit bar.

As shown in FIGS. 1 and 5, table 26 has a pair of front and rear ears 54 on each lateral side thereof for engaging front and rear vertical planar guide surfaces on posts 14 and 16 and thereby guide table 26 as it moves vertically up and down relative to base plate 12. The table also has a pair of laterally spaced pillow blocks 56 downwardly depending therefrom, with a horizontal plate 58 interconnecting the bottoms of blocks 56.

The adjustment mechanism for raising and lowering table 26 relative to base 12 includes crank shaft 60 journalled at 62 and 64 in pillow blocks 56 and having its outer end projecting outwardly through a vertical slot 65 in column 16 and panel 36 with a crank arm 66 mounted thereon externally of side panel 36. Fixed on crank shaft 60 are a pair of laterally spaced helical gear pinions 68 and 70 which rotate a pair of mating helical gears 71 and 72 that are fixed to the upper ends of vertical, perpendicularly arranged table raising screws 74 and 76. Screws 74 and 76 are respectively journalled in bearing supports 78 and 80 mounted in transverse plate 58, the screws threadedly extending through adjusting nuts 82 and 84 and passing downwardly through suitable openings in base plate 12. Nuts 82 and 84 are normally clamped in a fixed position on base plate 12 by clamp assemblies 86, each of which includes an L-shaped clamp the vertical leg 87 of which is fixed to plate 12 and the projecting end of the horizontal leg 88 is clamped into locking engagement with an adjusting nut 82 or 84 by a bolt 89 which passes through leg 88 and threads into base plate 12. Each of the adjusting nuts has a lateral opening 90 for the purpose of rotating the nuts and making very fine table height adjustments when the respective clamp assembly is sufficiently loosened, thus enabling an operator to obtain an accurately horizontally leveled table with respect to the cutter head and feed roller components.

Thus, as crank 66 and shaft 60 are rotated, screws 74 and 76 will be rotated within nuts 82 and 84 to either raise or lower table 26 as desired by an operator to make table height adjustments to accommodate workpieces of different thicknesses. An indicator 92 cooperates with a scale 94 mounted on column 16 to enable the operator to quickly adjust the table below the cutter head to any desired distance depending on the thickness of work involved.

The upper surface of table 26 is coated with a low friction, abrasion resistant material 96 to provide a smooth planar surface over which the woodpiece being cut may readily slide. Coating material 96 may be any suitable material which fulfills the following requirements:

1. The material must have a low coefficient of friction with respect to wood to provide an extremely high slip surface.
2. The material must provide a homogeneous surface at a minimum thickness of 0.030 inches.
3. The material must be of the same thickness throughout within 0.003 inches.
4. The material must be slick enough to perform satisfactorily on a properly adjusted planing machine without exhibiting any stick-slip properties.
5. The material must be abrasion resistant and capable of withstanding abusive usage caused by heavy rough lumber sliding thereover through the cutting area of the planing machine.
6. The material must be unaffected by most corrosive environments and be capable of withstanding outside weather conditions including dampness and 100° high and −30° low temperatures without warping or breaking the internal material bond.
7. The material must be non-galling with wood products.
8. The material must be readily cut, sawed, drilled die-cut or punched for ready application on table 26.

Examples of suitable materials which may be employed as coating 96 are plastic products known as Polyolefin and Teflon S. In general, the material employed should possess the desired properties of toughness and lubricity.

The coating 96 may be applied in any suitable fashion e.g., simply by fastening or adhesively bonding a sheet of material on table 26.

As indicated above, the use of this low friction coating 96 on the upper surface of table 26 eliminates the need for the heretofore conventional idling bed rollers, which ordinarily had to be accurately set within thousandths of an inch above the table for efficient planer operation. As a result, the finished woodpiece possesses a smoother planed surface having no snipes or tapers normally caused by the presence of the conventional bed rollers, and overall manufacturing and operating costs are accordingly reduced due to the elimination of the bed rollers and the necessary critical adjustments normally associated therewith.

Table 26 also has a pair of guide bars 97 extending along its length at its lateral edges to guide longitudinal movement of a woodpiece through the machine.

Referring now to FIGS. 6 and 7, a cutter head 20 having a plurality of cutters 21, serrated infeed roller 22 and smooth surfaced outfeed roller 24 are rotatably mounted in columns 14 and 16 about axes parallel to each other and to the horizontal planar work supporting surface 96.

Roller 22 has reduced end shaft portions 103 and 104 journalled in respective bearing support blocks 105 that are mounted in columns 14 and 16 for limited vertical movement and spring biased by springs 105a toward their lower limit positions, preferably in the manner illustrated in U.S. Pat. No. 2,873,776. As illustrated in FIG. 7 shaft portion 104 extends through block 105 beyond the side of column 14.

Similarly outfeed roller 24 has reduced end shaft portions 106 and 107 journalled in identical bearing support blocks 105, with shaft portion 107 projecting beyond the side of column 14.

During operation of the machine, rollers 22 and 24 will resiliently engage the upper surface of the workpiece due to the resilient mounting of bearing blocks 105.

Cutter head 20 also has reduced end portions 108 and 109 journalled in bearing housings 110 which are mounted in columns 14 and 16, and shaft portion 109 extends through its bearing housing 110 beyond the side face of column 14. As shown in FIG. 6, cutter head 20 will rotate in a direction opposite to that of rollers 22 and 24.

A front depth of cut limit bar 98 (See also FIG. 5) extends between and is eccentrically rotatably mounted in columns 14 and 16 by its eccentric reduced ends 100 at the infeed end of the machine in front of infeed roller 22. Limit bar 98 is fixed against rotation during operation of the machine by clamp screws 102 which thread into bar ends 100 and tightly engage the side faces of column 14 and 16. Limit bar 98 functions to structurally stabilize the front upper ends of columns 14 and 16 and also acts as a limit gauge limiting the depth of cut which may be taken by cutters 21 from the top of the workpiece passing underneath. It is to be noted that simply by rotating limit bar 98, the distance between the horizontal cutting plane of cutters 21 and a parallel line tangent to the bottom surface of limit bar 98 may be varied, thereby varying the depth of cut which may be taken by the planer.

Referring again to FIG. 6, the illustrated position of limit bar 98 permits a maximum depth of cut of a given amount with the height of table 26 properly adjusted for a workpiece having a given thickness. However, rotation of bar 98 through about 180° will approximately double the maximum depth of cut which may be taken from the workpiece. For example, in an actual machine the maximum depth of cut may be varied from one-quarter inch to one-half inch merely by adjusting bar 98.

A rear tie bar 111 extends transversely between posts 14 and 16 at the outfeed end of the planer and serves to structurally stabilize the upper rear ends of columns 14 and 16. Bar 111 is high enough above table 26 so that it is cleared by the finished workpiece being discharged from the machine.

The pivotable chip breaker and cutter guard assembly 18 includes a heavy arcuate walled casting section 112 partially encircling the cutter in radial outwardly spaced relation and which has at its rear end a pair of downwardly depending side lugs 113 pivoted by pins 114 to the inside faces of columns 14 and 16, and has a tapered terminal end 115 positioned immediately adjacent the cutting circle of cutters 21 to intercept and break the wood chips at the moment of cut so the cutters may carry the chips upwardly and project them rearwardly to the outfeed end of the machine away from the operator's position at the infeed end thereof. The tapered end 115 is designed so that it will clear infeed roller 22 when casting 112 is pivoted about pin 114.

A relatively thin sheet metal cover plate 116 is connected to the rear end of casting 112 and extends forwardly and downwardly over infeed roller 22 and tie bar 98 to the infeed end of the machine. Cover 116 is supported by a pair of circular extension rods 118 (only one shown in FIG. 6) threaded into a pair of lugs 120 integral with casting 112 at the lateral edges thereof, with the forward ends of rods 118 being fastened to cover 116 by screws 121. Rods 118 rest on shaft portions 103 and 104 of infeed roller 22 at 123a and thereby automatically position and support tapered end 115 relative to the cutting circle of cutters 21 and the lower edge 122 of cover 116 at a proper height above table surface 96 so as not to interfere with the gauging function of limit bar 98.

A pressure bar 123 is also resiliently mounted between columns 14 and 16 in conventional manner and has a skirt portion 124 which depends between cutter head 20 and outfeed roller 24 and terminates in a workpiece engaging edge 125 that extends parallel to the axis of rotation of cutter head 20.

It is apparent that when an operator must gain access to the feed rollers, cutter head, or other components for adjustment or repair purposes, he need only pivot the entire cutter guard and chip breaker assembly 18 upwardly and rearwardly about pivot pins 114 and thereby immediately expose the necessary parts.

Figure 8:
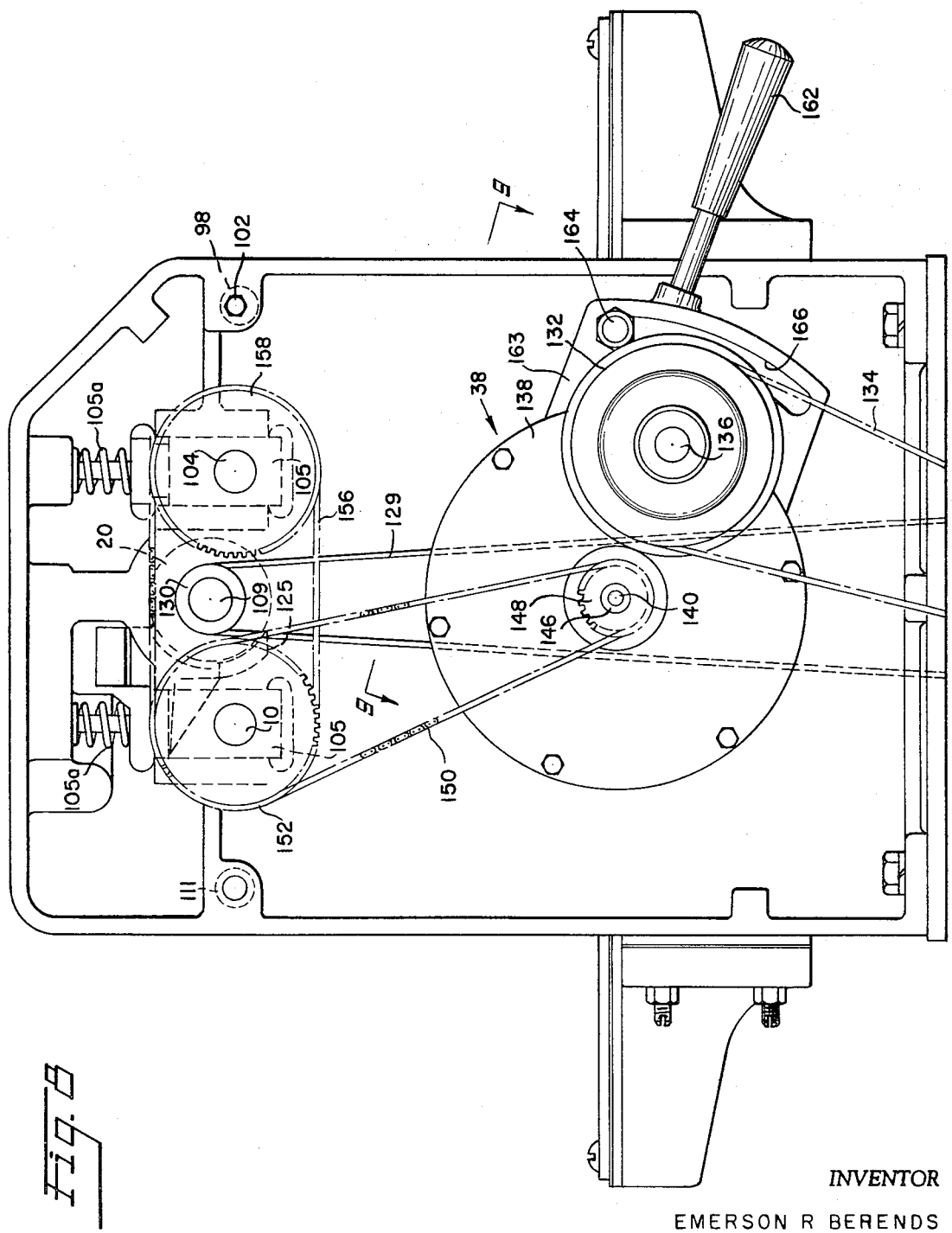
FIG. 8 is a fragmentary side elevation view illustrating particularly the intermediate variable speed drive mechanism by which the infeed and outfeed rollers are driven.

Referring now particularly to FIGS. 1, 8 and 9, the drive system for cutter head 20 and infeed and outfeed rollers 22 and 24 includes a motor 29 mounted within cabinet 10, the motor having an axially extending shaft 126 on which a first inner pulley 127 of fixed diameter is mounted adjacent the motor housing and a second outer pulley section 128 is formed directly on the outer end of shaft 126.

Cutter head 20 is driven directly from pulley 127 by a belt drive connection 129 which extends from pulley 127 to a pulley 130 of smaller diameter fixed on the projecting end of shaft portion 109 of cutter head 20.

Infeed and outfeed rollers 22 and 24 may be driven at a selected speed by an intermediate drive assembly 38 which includes a conventional spring biased variable diameter pulley 132 driven by a belt connection 134 from pulley section 128 which is on the outer end of motor shaft 126. Pulley 132 is fixed on the outer end of a shaft 136 rotatably mounted through the outer wall of housing 137 of a gear reduction unit 138 which is pivotally mounted on a shaft 140 extending through the wall of housing 137 and fixed at 141 to column 14. Gear reduction unit 138 includes a pinion gear 142 mounted on the inner end of shaft 136 and driving a spur gear 144 fixed on the inner end of a sleeve shaft 146 rotatably mounted on shaft 140 and extending outwardly through the outer wall of housing 137. A drive sprocket 148 is fixed on the outer end of sleeve 146 and is drive connected by a chain 150 to a sprocket 152 fixed on the outermost end of projecting shaft portion 107 of outfeed roller 24. A second sprocket 154 is mounted on shaft portion 107 inwardly of sprocket 152 and is drive connected by chain 156 to a sprocket 158 fixed on the projecting shaft portion 104 of infeed roller 22. Sprockets 152, 154 and 158 are of the same diameter and thereby drive rollers 22 and 24 at the same speed.

The entire reduction unit 138 is pivoted about fixed axis 140 by handle 162 connected to an integral extension 163 of housing 137 to vary the effective diameter of variable diameter pulley 132, with the unit 138 being retained in a desired position by bolt assembly 164 which threads into column 14 and rides in an arcuate slot 166 formed in extension 163, the slot being arranged along a circular path having fixed shaft 140 as its axis of rotation.

The drive system for the planing machine of the invention is advantageous in that the cutter head 20 is driven at a constant high speed by motor 29 and feed rollers 22 and 24 may be driven at a selected one of various speeds from the same motor 29 through the intermediate drive assembly 38. Depending upon the type of work being planed and the depth of cut to be taken from the workpiece, gear reduction unit 138 may be pivotally adjusted to vary the effective diameter of variable diameter pulley 132 and thereby provide an optimum feed rate for the workpiece through the machine.

In operation, table 26 will be adjusted by rotating crank 66 to a desired height and eccentric limit 98 is adjusted to a position to fix the maximum depth of the cut which is to be taken.

The feed rate for the workpiece is also adjusted by pivoting drive assembly 38 to a selected position. Each of these adjustments, of course, are somewhat related to each other and will vary depending upon the type of work being planed and the depth of cut being taken.

Referring to FIG. 6, a workpiece will be placed on the smooth table surface 96 and manually fed into the machine until its leading edge passes under limit bar 98 and is engaged by the clockwise rotating serrated infeed roller 22. It is then automatically fed through the cutting region of counterclockwise rotating cutter head 20 which planes its upper surface, past the engaging pressure bar edge 125, after which its planed surface is engaged by the smooth clockwise rotating outfeed roller 24 which feeds it to the outfeed end of the machine. As cutter head 20 planes the workpiece, the chips are broken by the tapered edge 115 and carried upwardly and rearwardly along the inner adjacent curved surface of arcuate casting section 112 and deposited at the outfeed end of the machine.

It is to be noted particularly that the workpiece rests on the smooth, low friction planar table surface 96 at all times as it passes through the machine. This is in contrast to prior machines in which the normally employed bed rollers projected slightly above the table and caused a snipe or taper to be placed on the planed surface of the workpiece. By providing the tough low friction surface 96 on table 26, the invention very effectively eliminates the need for the bed rollers and problems associated therewith.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a planing machine having infeed and outfeed ends, a pair of vertical support columns fixed in lateral spaced relationship, a workpiece supporting table extending transversely between said columns, rotatable cutter means extending between said columns above said table, a workpiece infeed roller extending transversely between said columns and end supported therein above said table in position to engage a workpiece to feed it over said table into cutting relationship with said cutter means, a cutter guard and chip breaker assembly pivotally connected to said columns at the outfeed end thereof and having a terminal end positioned immediately adjacent the cutting circle of said cutter means, said assembly in a normal operative position intercepting and breaking chips from said cutter means closely adjacent the point of cut and directing them rearwardly toward said outfeed end and in a raised inoperative position exposing said cutter means and said feed roller for ready access thereto by an operator.

2. In a planing machine as defined in claim 1, said table having a coating thereon which provides a smooth anti-friction workpiece engaging surface over which the workpiece may readily slide.

3. In a planing machine as defined in claim 1, said cutter guard and chip breaker assembly comprising an arcuate section extending forwardly from its pivot connection and downwardly in front of said rotatable cutter means to a tapered terminal end positioned adjacent the cutting circle of said rotatable cutter means when said assembly is in said operative position, whereby chips from said cutter means are broken by said terminal end and carried upwardly by said rotatable cutter means and projected rearwardly along said arcuate section to the outfeed end of said machine.

4. In a planing machine as defined in claim 3, support rod means projecting from said cutter guard and chip breaker assembly to operatively rest on said infeed roller to fix the operative position of said cutter guard and chip breaker assembly and its terminal end relative to said cutter means.

5. In a planing machine as defined in claim 3, a depth of cut limit bar extending transversely between said columns at said infeed end to define an entrance throat gauging the thickness of a workpiece that may be fed to the cutter means at any table setting.

6. In a planing machine as defined in claim 5, wherein said limit bar has opposite ends in the form of stub shafts journalled in said columns and an eccentric midportion and means is provided at least on one stub shaft to fix said limit bar in a selected angular position whereby the maximum depth of cut may be varied between a predetermined minimum and maximum.

7. In a planing machine, a pair of vertical support columns fixed in lateral spaced relationship, a workpiece supporting table extending transversely between said columns, rotatable cutter means extending between said columns above said table, workpiece feed roller means extending transversely between said columns and rotatably supported therein for feeding a workpiece over said table into cutting relationship with said cutter means, a motor having a shaft, cutter drive means drive connecting said motor shaft to said cutter means, variable speed drive means drive connecting said motor shaft to said feed roller means independently of said cutter drive means, said variable speed drive means including a speed reducing drive mechanism pivotally mounted on one of said columns and having input shaft means and output shaft means, means drive connecting said input shaft means to said motor shaft and including a variable diameter pulley, and means drive connecting said output shaft means to said feed roller means, whereby the rotational speed of said feed roller means may be varied by pivotally adjusting said drive mechanism to a selective position to vary the effective diameter of said variable diameter pulley.

8. In a planing machine as defined in claim 7, said table having a coating thereon which provides a smooth anti-friction workpiece engaging surface over which the workpiece may readily slide.

9. In a planing machine as defined in claim 7, said speed reducing drive mechanism including a housing, said input shaft means rotatably journalled through a wall of said housing, said pulley being fixed against rotation on the outer end of said input shaft means, said output shaft means including a fixed shaft extending through said housing and fixed at one end to said one of said columns, said fixed shaft providing the pivot axis of said drive mechanism, a sleeve rotatably mounted on said fixed shaft and extending through said one housing wall, means within said housing drive connecting said input shaft means and said sleeve, and means drive connecting said sleeve and said feed roller means.

10. In a planing machine as defined in claim 9, wherein said drive mechanism includes reduction gear means within said housing for drive connecting said input shaft means and said sleeve.

11. In a planing machine as defined in claim 9, a frame on which said support columns are mounted, an enclosure within which said motor is located, said enclosure having at least one cover panel removably connected to said frame, said panel having end flanges for abutting against said frame and each flange having at least one slot including a first portion of a given size and a second portion of a smaller size, a pair of bolt assemblies connected to said frame, each bolt assembly including a bolt fixed to said frame, a retaining member slidably mounted on the shank of said bolt, said retaining member being smaller in size than said first slot portion and larger than said second slot portion, biasing means positioned between the head of said bolt and retaining member to bias the latter toward said frame, whereby said panel is fixed on said frame when said bolt shanks are received in said second slot portions and said end flanges are positioned between said retaining members and said frame, said panel being removable from said frame by aligning said first slot portions with said retaining members and thereafter withdrawing said panel over said retaining members and the heads of said bolts.

12. In a planing machine as defined in claim 11, comprising a side cover panel having slotted end flanges identical to said motor cover panel and retained on said one column by others of said bolt assemblies and, when removed, providing ready access to various machine components such as said variable speed drive assembly housed therein.

13. In a planing machine having infeed and outfeed ends, a pair of vertical support columns fixed in laterally spaced relationship, a workpiece supporting table extending transversely between said columns, rotatable cutter means extending between said columns above said table, workpiece feed roller means extending transversely between said columns and end supported therein and adapted to engage a workpiece to feed it over said table into cutting relationship with said cutter means, a depth-of-cut limit bar extending transversely between said columns above said table at said infeed end, said limit bar having eccentric end sections rotatably mounted in said columns whereby the effective height of said limit bar above said table may be varied to select a depth-of-cut limit, a motor having a shaft, cutter drive means drive connecting said motor shaft to said cutter means, variable speed drive means drive connecting said motor shaft to said feed roller means independently of said cutter drive means, whereby the effective height of said eccentrically mounted limit bar above said table and the speed at which said feed roller means is driven may be selectively correlated to assure optimum utilization of said variable speed drive means and the power of said motor.

14. In a planing machine as defined in claim 13, said table having an uninterrupted workpiece support face provided with a smooth, antifriction, abrasion resistant coating permitting said workpiece to readily slide thereover.

15. In a planing machine as defined in claim 14, a fixed horizontal base, means for adjusting said table vertically above said base between said columns, said adjusting means including a horizontal crank shaft rotatably connected to said table for vertical movement therewith, vertical feed screw means drive connected to said crank shaft and passing through said base, an adjusting nut supported on said base and threadedly engaging said feed screw means, adjustable clamp means for normally clamping said nut to said base, said nut including fine adjustment means by which it may be rotated when said clamp means is loosened to permit fine adjustment of said table with respect to said vertical feed screw means, whereby, when said nut is clamped to said base, said table may be raised or lowered simply by rotation of said crank shaft to cause said feed screw means to thread up or down through said adjusting nut.

16. In a planing machine as defined in claim 15, said fine adjustment means being a hole on the side of said nut by which an operator, using a proper tool, can turn said nut on said screw means.

17. In a planing machine as defined in claim 13, said variable speed drive means comprising a variable diameter pulley drive connected to said motor shaft, a drive mechanism pivotally mounted on one of said columns, said drive mechanism including a housing, a first shaft rotatably journalled through a wall of said housing, said pulley being fixed against rotation on the outer end of said first shaft, a second fixed shaft extending through said housing and fixed at one end to said one of said columns, said second shaft providing the pivot axis of said drive mechanism, a sleeve rotatably mounted on said second shaft and extending through said one housing wall, means within said housing drive connecting said sleeve and said feed roller means, whereby the rotational speed of the said feed roller means may be varied by pivotally adjusting said drive mechanism to a selected position, thereby varying the effective diameter of said variable diameter pulley.

18. In a planing machine as defined in claim 17, a frame on which said support columns are mounted, an enclosure within which said motor is located, said enclosure having at least one cover panel removably connected to said frame, said panel having end flanges abutting against said frame, each flange having at least one slot including a first portion of a given size and a second portion of a smaller size, a pair of bolt assemblies connected to said frame, for cooperation with said slots, each bolt assembly including a bolt fixed to said frame, a retaining member slidably mounted on the shank of said bolt, said retaining member being smaller in size than said first slot portion and larger than said second slot portion, biasing means positioned between the head of said bolt and retaining member to bias the latter toward said frame, whereby said panel is fixed on said frame when said bolt shanks are received in said second slot portion and said end flanges are positioned between said retaining members and said frame, said panel being removable from said frame by aligning said first slot portions with said retaining members and thereafter withdrawing said panel over said retaining members and the heads of said bolts.

19. In a planing machine as defined in claim 18, a side cover panel having slotted end flanges identical to said motor cover panel and retained on said one of said columns by others of said bolt assemblies, said side panel when removed providing ready access to various machine components such as said variable speed drive assembly housed therein.

20. In a planing machine as defined in claim 19, a cutter guard and chip breaker assembly comprising an arcuate section having one end pivotally connected to said columns at the outfeed end of said machine and a tapered terminal end positioned adjacent the cutting circle of said cutter means when said assembly is in operative position, a cover portion connected to said arcuate section and extending forwardly therefrom over said feed roller means and said depth of cut limit bar, a support rod projecting from said arcuate section and operatively resting on said feed roller means to fix the operative position of said arcuate section and its terminal end relative to said cutter means, whereby during operation of the machine chips received from said cutter means are broken by said terminal end and directed upwardly and rearwardly along said arcuate section to the outfeed end of the machine by said cutter means.

21. In a planing machine as defined in claim 20, a pair of support rods each connected at one end to said arcuate section and having its other end connected to said cover portion, said rods resting on said feed roller means thereby supporting said arcuate section and cover portion when said assembly is in said operative position.

22. In a planing machine, a fixed horizontal base, a pair of vertical support columns extending upwardly from said base in laterally spaced relationship, a horizontal workpiece supporting table vertically movable above said base between said columns, rotatable cutter means extending between said columns above said table, means for adjusting said table above said base comprising a horizontal crankshaft, spaced support means fixed to the underside of said table, said crank-shaft being rotatably mounted in said support means for vertical movement with said table, a horizontal member fixed to the under-side of said table, vertical feed screw means including a pair of laterally spaced vertical screws rotatably mounted in said horizontal member and vertically stationary with respect to said table, the upper ends of said feed screws being drive connected to said crankshaft and the lower ends thereof passing through said base, a pair of adjusting nuts supported on said base and each nut respectively threadedly engaging one of said spaced feed screws, adjustable clamp means for normally clamping said nuts to said base, said nuts including fine adjustment means by which each may be rotated when said clamp means is loosened to permit fine adjustment along its feed screw and levelling of said table, said nuts when clamped to said base permitting said levelled table to be raised or lowered merely by rotation of said crankshaft to thread said feed screws up or down through said adjusting nuts.

23. In a planing machine as defined in claim 22, said fine adjustment means being a hole in the side of said nut by which an operator using a proper tool may turn said nut on said feed screw means.

24. In a planing machine having infeed and outfeed ends, a pair of vertical support columns fixed in laterally spaced relationship, a workpiece supporting table extending transversely between said columns, rotatable cutter means extending between said columns above said table, workpiece feed roller means supported between said columns above said table for feeding a workpiece over said table into cutting relationship with said cutter means, a depth-of-cut limit bar extending transversely between said columns above said table at said infeed end, said limit bar having eccentric end sections adjustably rotatably mounted in said columns whereby the effective height of said limit bar above said table may be varied to vary the maximum depth of cut which may be taken by said cutter means.

25. In a planing machine as defined in claim 22, said table having a coating thereon which provides a smooth anti-friction workpiece engaging surface over which the workpiece may readily slide.

* * * * *